United States Patent
Lysejko et al.

(10) Patent No.: US 7,627,348 B2
(45) Date of Patent: Dec. 1, 2009

(54) POINT TO MULTIPOINT DEVICE FOR COMMUNICATION WITH A PLURALITY OF TELECOMMUNICATIONS UNITS

(75) Inventors: Martin Lysejko, Bagshot (GB); Andrew Logothetis, Beaconsfield (GB)

(73) Assignee: Airspan Networks, Inc., Boca Raton, FL (US)

( * ) Notice: Subject to any disclaimer, the term of this patent is extended or adjusted under 35 U.S.C. 154(b) by 542 days.

(21) Appl. No.: 11/564,248

(22) Filed: Nov. 28, 2006

(65) Prior Publication Data

US 2007/0135172 A1     Jun. 14, 2007

(30) Foreign Application Priority Data

Dec. 9, 2005   (GB)  ................................... 0525161.6
Jun. 7, 2006   (GB)  ................................... 0611230.4

(51) Int. Cl.
  H04B 1/38   (2006.01)
  H04B 3/20   (2006.01)
  H04B 7/216  (2006.01)
  H04J 3/06   (2006.01)

(52) U.S. Cl. .................... 455/562.1; 370/292; 370/320; 370/350; 455/422.1; 455/561

(58) Field of Classification Search ............. 455/422.1, 455/561, 562.1; 370/292, 320, 350
See application file for complete search history.

(56) References Cited

U.S. PATENT DOCUMENTS

| | | | | |
|---|---|---|---|---|
| 6,157,631 A | * | 12/2000 | Rohani | ........................ 370/342 |
| 6,404,803 B1 | * | 6/2002 | Wang et al. | .................. 375/148 |
| 6,650,881 B1 | * | 11/2003 | Dogan | ...................... 455/276.1 |
| 6,873,647 B1 | * | 3/2005 | Tiedemann et al. | ......... 375/145 |

(Continued)

FOREIGN PATENT DOCUMENTS

GB    2407008 A    4/2005

(Continued)

OTHER PUBLICATIONS

"Chapter 3: Introduction to Smart Antennas: Spatial Processing for Wireless Systems," Smart Antennas, Adaptive Arrays, Algorithms, and Wireless Position Location, ed. TS Rappaport, Sep. 1998, pp. 81-116, IEEE Press, NJ.

(Continued)

*Primary Examiner*—Vincent P Harper
*Assistant Examiner*—Marivelisse Santiago-Cordero
(74) *Attorney, Agent, or Firm*—Haynes Beffel & Wolfeld LLP

(57) ABSTRACT

A point to multipoint device for use in a wireless network operates a sequence of variable duration communication channels, allocatable to telecommunications units. A training sequence indication and a repetition rate indication are stored indicating a training sequence and repetition rate for the training sequence in the sequence of communication channels associated with the point to multipoint device. An interface receives a synchronization signal issued to all point to multipoint devices in the wireless network, and uses it to determine a time for a first occurrence of the training sequence to occur. Communication channel control logic causes control data to be transmitted to the telecommunications units identifying the sequence of channels, the training sequence indication and the repetition rate. Beamforming logic determines beamforming weights used to produce a reception beam at an antenna array.

22 Claims, 10 Drawing Sheets

U.S. PATENT DOCUMENTS

| | | | |
|---|---|---|---|
| 6,888,882 | B1 | 5/2005 | Dogan |
| 2003/0072452 | A1 | 4/2003 | Mody et al. |
| 2003/0087640 | A1* | 5/2003 | Rotstein et al. ............. 455/446 |
| 2004/0142665 | A1 | 7/2004 | Papathanasion et al. |
| 2004/0235527 | A1 | 11/2004 | Reudink et al. |
| 2005/0163236 | A1 | 7/2005 | Hammerschmidt et al. |
| 2006/0233270 | A1* | 10/2006 | Ahn et al. ................... 375/260 |

FOREIGN PATENT DOCUMENTS

| | | |
|---|---|---|
| WO | 9965160 | 12/1999 |
| WO | 02087110 A1 | 10/2002 |
| WO | 2004059879 A1 | 7/2004 |

OTHER PUBLICATIONS

Search report in GB0611230.4 dated Sep. 8, 2006.
Agere Systems, Inc. et al., "TGn Sync, An IEEE 802.11n Protocol Standard Proposal Alliance, PHY Overview," Jun. 2004, XP-002410959, 42pp.
International Search Report, PCT/GB2006/004434, mailed Mar. 12, 2007.

* cited by examiner

- T(i): Transmission start time for the i<sup>th</sup> Variable Duration Communication Channel (VDCC)
- N: Number of VDCC that want to transmit data
- $L_{UL}$: Length of UL frame
- $L_{TS}$: Length of training sequence
- $P_{TS}$: Period of training sequence
- L(i): Length of the i<sup>th</sup> VDCC

POINT TO MULTIPOINT DEVICE FOR COMMUNICATION WITH A PLURALITY OF TELECOMMUNICATIONS UNITS

BACKGROUND OF THE INVENTION

1. Field of the Invention

The present invention relates to a point to multipoint device for use in a wireless network to provide wireless communication with a plurality of telecommunication units, to a method of operating such a device, and to a wireless network comprising a plurality of such point to multipoint devices.

2. Description of the Prior Art

Point to multipoint devices within a wireless network may take a variety of forms. For example, such a point to multipoint device may take the form of a relay node or repeater used to propagate data within the wireless network. Such relay nodes or repeaters typically amplify and forward or decode and forward received signals within the wireless network. Another example of a point to multipoint device would be a base station associated with a cell of the wireless network for communicating over wireless links with a number of subscriber stations and/or relay nodes in the cell.

A wireless network infrastructure typically subdivides a geographic area into mutually disjoint regions called cells. Associated with each cell are one or more base stations (BSs) that communicate via radio signals with a number of subscriber stations (SSs) located within the same cell. The transmission path from the BS to the SS is known as the forward link or downlink communication path, whilst the transmission path from the SS to the BS is known as the reverse link or uplink communication path.

In one implementation, the BS may be connected to a telephone network and exists to relay messages from SSs in the cell controlled by the BS to the telephone network, and vice versa. By this approach, an item of telecommunications equipment connected to an SS may make an outgoing call to the telephone network, and may receive incoming calls from the telephone network.

However, such a wireless telecommunications system is not restricted to use with telephone signals, but could instead, or additionally, handle any other appropriate type of telecommunications signal, such as video signals, or data signals such as those used for transmitting data over the Internet and in order to support recent technology such as Broadband and video-on-demand technologies.

Within such a wireless network, a measure of the received signal quality is the Signal to Interference and Noise Ratio (SINR). For a given SINR, the receiver (for example the receiver provided at an SS) can request a suitable Modulation and Coding Scheme (MCS) that will maximise the data rate and at the same time ensure an acceptable Quality of Service (QoS). The Frame Error Rate (FER), i.e. the percentage of blocks of data that are received in error, is frequently used as a measure of the QoS. If a block of data is incorrectly decoded, then the receiver will inform the transmitter (for example the transmitter at the BS when considering the receiver at the SS) to resend the data. Whilst such a scheme is necessary to maintain an acceptable QoS, data repetition has the drawback of reducing the overall system throughput.

Cell sectorisation is a well-known technique for increasing the system capacity, system capacity being a measure of the ability of a network to serve and sustain simultaneous users. In cell sectorised layouts, the area within a cell is, under ideal situations, sub-divided into a number of non-overlapping regions called sectors. The sectors within the same cell are served by the same BS, or by different BSs (one per sector). In such sectorised layouts, the point to multipoint device may be considered to be the entire base station, or the sector specific logic, whether that be provided as a physically separate base station or as a part of a base station covering the entire cell. Sectorisation is generally implemented by employing highly directional antennas that concentrate the radiated energy within a sector. FIG. 1 shows a cellular network consisting of seven cells, with each cell comprising three sectors. Hence, by way of example, the cell 10 illustrated in FIG. 1 is served by a base station 20 which can provide separate beams to cover the three sectors 30, 40, 50 provided within the cell 10.

Typically, a BS may need to communicate simultaneously with multiple SSs within a sector or a cell. Typically, such simultaneous communication can be achieved by defining multiple communication channels that can be arranged to utilise the radio resource of the wireless network. For example, in a "Time Division Multiple Access" (TDMA) system, a particular frequency channel can be partitioned in the time domain, such that a number of different signals can be transmitted in different time slots, the time slots forming multiple communication channels utilising the particular frequency channel. As another example, in a "Frequency Division Multiple Access" (FDMA) system, a band of frequencies may be partitioned to form a number of communication channels of particular frequencies, thereby enabling multiple signals to be transmitted over the radio resource. In a combined TDMA/FDMA system, such as used in WiMAX systems, a combination of time/frequency slot is used to define separate communication channels. WiMAX systems are based on the IEEE 802.16 standards that provide high-throughput broadband connections over relatively long distances.

As another example of a mechanism that can be used to establish multiple communication channels within a radio resource, in a "Code Division Multiple Access" (CDMA) system, signals may be transmitted over the radio resource on a particular frequency channel, and this frequency channel may be partitioned by applying different orthogonal codes to signals to be transmitted on that frequency channel. Signals to which an orthogonal code has been applied can be considered as being transmitted over a corresponding orthogonal communication channel utilising a particular frequency channel.

The total number of resources (i.e. channels) in a wireless network is limited. In order to increase the system capacity it may be necessary to use the same channel in different cells and/or sectors. This is known as channel re-use. The cells or sectors that use the same set of channels are known as co-channel cells or sectors, and the interference generated as a result is referred to as Co-Channel Interference (CCI). CCI degrades the quality of the received signal and thus CCI impacts negatively on the system throughput. Considering again FIG. 1, it will be noted that there are crossover regions between adjacent sectors in FIG. 1. CCI in these locations will be high, and can be avoided by using different channels on overlapping sectors.

Another way to mitigate the CCI is to use antenna arrays at the BS, such antenna arrays being described for example in Chapter 3 of the publication "Smart Antennas, Adaptive Arrays, Algorithms, and Wireless Position Location", edited by Dr T S Rappaport, IEEE, NJ 1998, that chapter providing an introduction to smart antennas and spatial processing. An advanced (also referred to in the art as smart) antenna array consists of two or more closely spaced antennas, and in combination with a beamforming network, narrow beams with increased signal strength can be formed in the direction of the desired SS. Exploiting the spatial separation between users, the advanced antenna array can also reduce the interference to other SSs. The overall benefits of antenna arrays are increased range and improved signal strength (due to the antenna array gain), along with increased system capacity due to the efficient utilisation of spectral resources, i.e. reduced CCI.

One known type of smart antenna array is referred to as a fixed multi-beam antenna array system, where a finite number of fixed beams with predefined beam patterns and fixed pointing directions are employed. Another alternative type of smart antenna is the steered beam, or fully adaptive, antenna system. Unlike the fixed multi-beam systems, a steered beam system can radiate its energy in any direction, and in some cases can ensure little or no interference (nulling) in certain other directions.

Considering the uplink communication from a SS (or more generically a telecommunications unit) to a BS (or more generically a point to multipoint device), each BS can define a sequence of variable duration communication channels to be used for the uplink communication, and particular SSs within the cell or sector will then be allocated one of those communication channels as and when required to enable communication to take place on the uplink between that SS and the associated BS. Typically the communication is broken down into separate frames, and the sequence of variable duration communication channels can be defined for each frame. One example of a communication structure that can be used is shown in FIG. 2, which illustrates a Time Division Duplex (TDD) communication structure, where uplink and downlink transmissions occur at different times but share the same frequency. An example of a system that may use such a TDD communication structure is a WiMAX system, where the TDD mode is implemented by subdividing each frame into a downlink subframe and an uplink subframe. Accordingly, as shown in FIG. 2, the communication takes place between a BS and a plurality of associated SSs via a series of frames 100. Considering for example the frame n 105, this consists of a downlink (DL) subframe 110 and an uplink (UL) subframe 115. Considering the UL subframe 115, this is subdivided into one or more variable duration communication channels, referred to in FIG. 2 as bursts 120, 125, 130. Each burst is preceded by a training sequence TS, such training sequences being used for uplink channel estimation, i.e. to allow the receiving BS to estimate the amount of distortion in that channel.

Due to the fact that the SS allocated to any particular uplink communication channel can vary between frames, and given that the length of each communication channel can vary from frame to frame, this can give rise to varying degrees of CCI within the uplink subframe. This problem is illustrated farther with reference to FIGS. 3 and 4. As shown in FIG. 4, an example configuration has two SSs, namely SS1 305 and SS2 310, associated with a first base station, BS1 300, whilst a further SS, namely SS3 320, is associated with a second BS, namely BS2 315. During the time interval $T_1$, shown in FIG. 3, the signal 200 from SS1 305 is received at BS1 300 and BS2 315, as shown in the left-hand half of FIG. 4. The signal from SS1 acts as a co-channel interferer to the desired signal 220 from SS3 320 at BS2 315. Similarly, the signal from SS3 320 acts as a co-channel interferer to the desired signal from SS1 305 at BS1 300. In this example, it is assumed that the SSs SS1, SS2 and SS3 all communicate on the same frequency channel, and accordingly the signals from SS1 and SS3 cause CCI during the time interval $T_1$. During the time interval $T_2$, the signal 220 from SS3 320 will continue to act as a co-channel interferer at BS1 300, but the signal 210 from SS2 310 is the new co-channel interferer at BS2 315. Hence, as shown in FIG. 4, it can be seen that in addition to the desired signals 325, there are also interfering signals 330 that contribute to CCI.

The CCI can be mitigated using smart antennas. If a fixed multiple-beam antenna array system is used, then BS1 300 can select a fixed beam to be used in the uplink to enhance the signal quality of the signals from SS8 305 and SS2 310, whilst suppressing the interference arising from the signal issued by SS3 320. Likewise, a fixed multi-beam system in BS2 315 would be capable of suppressing, to some extent, the interference resulting from the signals issued by SS8 305 and SS2 310.

If a steered beam antenna system is used instead of a fixed multi-beam antenna system, then the training sequences issued at the beginning of each communication channel may be used by the associated BS to estimate the channel impulse responses from the SSs to the BSs and/or the array response at the BSs. Broadband or narrow band beamformers can be designed to collect the energy from the desired SSs. In some embodiments, the broadband or narrow band beamformers can be designed to not only collect the energy from the desired SSs, but also optionally place nulls in the direction of any SS introducing CCI. Considering again the example of FIG. 3, it can be seen that BS1 300 can based on the training sequence 205 produce a first steered beam to use during time period $T_1$, and then based on the training sequence 215 produce a different steered beam to use during the time period $T_2$, and in both cases these steered beams may be arranged to place a null in the direction of SS3 320. However, in contrast, BS2 315 will use the training sequence 225 to produce a steered beam which is then used for the entire duration of the communication channel 220 used by SS3 320 to communicate uplink data to BS2 315. Whilst this may place a null in the direction of SS1 305, since that was the source of CCI at the time the beam was calculated, it will not be able to take account of the new source of CCI, namely SS2 310 that is introduced part way through transmission on that communication channel 220, and accordingly this will give rise to an elevated level of CCI during period $T_2$. Indeed, it may well be the case that when using a steered beam antenna system, the CCI from SS2 will not only not be sufficiently suppressed, but may in some instances actually be amplified.

Accordingly, it would be desirable to provide a technique which enabled a further reduction in CCI within a wireless network.

US 2004/0235527 discusses techniques for CCI suppression on the downlink transmission path. The techniques do not address the varying degrees of CCI within the uplink subframe. As discussed earlier, the CCI in the uplink path is due to the presence of the variable duration communication channels when the SSs communicate to the BS. Since a certain BS does not know the duration of the communication channels used by the SSs in other cells, the BS cannot suppress the uplink interference caused by the intercell interfering SSs. WO 2004/059879 suggests using beamforming at a mobile device for reception, and then applying the same beamforming weights for transmission on the uplink path. The technique is applicable to TD-SCDMA (Time Division Synchronous Code Division Multiple Access) mobiles and not for BSs that are subject to uplink CCI originating from intercell variable duration communication channels.

SUMMARY OF THE INVENTION

Viewed from a first aspect, the present invention provides a point to multipoint device for use in a wireless network to provide wireless communication with a plurality of telecommunications units, for communication from the telecommunications units to the point to multipoint device, the point to multipoint device being operable to define a sequence of variable duration communication channels, each communication channel being allocatable to one of said telecommunications units, the point to multipoint device comprising; training sequence storage for storing a training sequence indication indicating a training sequence associated with the point to multipoint device; repetition rate storage for storing a repetition rate at which the training sequence is to be repeated in said sequence of variable duration communication channels, the repetition rate being the same for all point to multipoint devices in the wireless network; an interface for receiving a synchronisation signal issued to all point to multipoint devices in the wireless network, the synchronisation signal being used to determine a time at which a first occurrence of the training sequence is to occur within the sequence of variable duration communication channels; communication channel control logic for defining the sequence of variable duration communication channels and for causing control data to be transmitted to the telecommunications units identifying the sequence of variable duration communication channels, the training sequence indication and the repetition rate; an antenna array for providing a reception beam for receiving the communication from the telecommunications units; and beamforming logic for determining beamforming weights used to produce the reception beam, the beamforming weights being determined so as to improve received signal quality, the beamforming logic being operable to repeat the determination of beamforming weights at the repetition rate coincident with the appearance of the training sequence in the sequence of variable duration communication channels.

In accordance with the present invention, a point to multipoint device is arranged to define a sequence of variable duration communication channels for use by telecommunications units when communicating with the point to multipoint device, and is arranged to cause control data to be transmitted to those telecommunications units identifying the sequence of variable duration communication channels, a training sequence indication indicating a training sequence associated with that point to multipoint device, and a repetition rate at which the training sequence is to be repeated in the sequence of variable duration communication channels. The repetition rate is set to be the same for all point to multipoint devices in the wireless network. Beamforming logic within the point to multipoint device is then arranged to determine beamforming weights to be used to produce a reception beam at the point to multipoint device and this beamforming logic is arranged to repeat this determination process at the repetition rate coincident with the appearance of the training sequence in the sequence of variable duration communication channels.

The timing of a first occurrence of the training sequence within the sequence of variable duration communication channels is determined with reference to a synchronisation signal that is issued to all point to multipoint devices in the wireless network. Since additionally the repetition rate is the same for all point to multipoint devices in the wireless network, this means that throughout the wireless network, training sequences will be transmitted at the same time and at the same repetition rate even though the individual communication channels are of variable duration, and accordingly if the beamforming weights are calculated coincident with the appearance of the training sequence, this provides a stable period in which to calculate those beamforming weights. Thereafter, the CCI observed will be stationary until the next training sequence appears in the sequence of variable duration communication channels, i.e. the statistics of the CCI will be constant during that period. Although the CCI will then change upon occurrence of each training sequence, new beamforming weights will in any case be determined at that time.

As a result, the technique of the present invention provides an effective mechanism for using a steered beam, or fully adaptive, antenna array to reduce CCI within the wireless network, even though any particular point to multipoint device has no control over the sequence of variable duration communication channels defined by other point to multipoint devices in the wireless network, nor does it have any control over the telecommunications units that are allocated to each communication channel by those other point to multipoint devices.

Whilst the sequence of variable duration communication channels is defined by the point to multipoint device, there are a variety of ways in which those communication channels can be used. For example, the particular telecommunication unit allocated to any particular communication channel may be predetermined, the start time for the sequence of communication channels may be predetermined, etc. However, in one embodiment, the point to multipoint device is able to determine which telecommunications unit is allocated to each communication channel based on information about which telecommunications units have data to send, and is further able to identify the start time for the sequence of variable duration communication channels. In one such embodiment, the communication channel control logic is operable to define the sequence of variable duration communication channels having regard to the telecommunications units that are to transmit data within those communication channels, the communication channel control logic being operable to cause an uplink map to be transmitted from the point to multipoint device identifying the sequence of variable duration communication channels, the telecommunications unit allocated to each communication channel, a start time for the sequence, the training sequence indication and the repetition rate.

In one embodiment, the point to multipoint device provides wireless communication within a plurality of sectors, the antenna array is arranged to produce a reception beam for each sector, and the communication channel control logic and beamforming logic are replicated for each sector. In some embodiments, for example where different channels are used for each sector, the same training sequence can be used for communication in each of the sectors. However, in alternative embodiments, for example where the same channels are used in more than one sector, the training sequence storage may be arranged to store a separate training sequence indication for each sector. This for example would allow a unique training sequence to then be associated with each sector.

The frequency with which the point to multipoint device re-defines the sequence of variable duration communication channels will vary dependent on the embodiment. However, in one embodiment, the wireless communication is composed of a plurality of frames, and the communication channel control logic is operable for each frame to define the sequence of variable duration communication channels to be used in that frame. Hence, the sequence of variable duration communication channels are in such embodiments defined on a frame by frame basis.

The frequency with which the synchronisation signal is issued to the point to multipoint device will vary dependent on the embodiment. In one embodiment, it may be sufficient for the synchronisation signal to be issued only once at start up time. However, in an alternative embodiment, the synchronisation signal is received by the interface every m-th frame, where m is greater than or equal to 1. In one particular embodiment, the synchronisation signal is received once every frame.

In one embodiment, the training sequence associated with the point to multipoint device is chosen to be unique with respect to other training sequences associated with other point to multipoint devices in the wireless network. There are a number of ways in which the training sequence can be arranged to be unique with respect to other training sequences associated with other point to multipoint devices in the wireless network. In one embodiment, the training sequence is arranged to be orthogonal with respect to the training sequences allocated to other point to multipoint devices in the wireless network. As a result, when the beamforming logic of the point to multipoint device is calculating the beamforming weights coincident with the appearance of the training sequence in the sequence of variable duration communication channels, the presence of the other orthogonal training sequences used by other point to multipoint devices will contribute minimal interference.

The way in which the unique training sequence is generated can take a variety of forms. In one embodiment the training sequence is formed by cyclic shifting a base training sequence, with that base training sequence being known to at least all of the point to multipoint devices in the wireless network. In one particular embodiment, the base training sequence is also known to the telecommunications units in the wireless network, and the training sequence indication provided from the point to multipoint device to the telecommunications units identifies the cyclic shift to be applied to the base training sequence in order to generate the training sequence associated with the point to multipoint device. In alternative embodiments, the training sequence indication can itself directly identify the training sequence.

The actual form of the training sequence repeated within the sequence of variable duration communication channels may in one embodiment be fixed. However, in an alternative embodiment, each instance of the training sequence included in the sequence of variable duration communication channels is altered in a predetermined manner with respect to a preceding instance, whilst maintaining the uniqueness of each instance with respect to corresponding instances of training sequences associated with other point to multipoint devices in the wireless network. This may for example be achieved by arranging each telecommunications unit to modify each instance of the training sequence in some predetermined way prior to issuing that training sequence.

The position at which the training sequence appears with the communication channels can be varied dependent on embodiment. However, in one embodiment, the communication channel control logic is operable to define the sequence of variable duration communication channels such that the training sequence is issued at least at the start of each communication channel. Hence, in such embodiments, the duration of each communication channel is arranged to be a multiple of the repetition rate.

The point to multipoint device may take a variety of forms. However, in one embodiment the point to multipoint device is a base station, the plurality of telecommunications units are a plurality of subscriber stations, and for uplink communication from the subscriber stations to the base station, the antenna array is operable to provide said reception beam for receiving the uplink communication provided in said sequence of variable duration communication channels.

In an alternative embodiment, the point to multipoint device is base station sector logic, the plurality of telecommunications units are a plurality of subscriber stations within an associated sector, and for uplink communication from the subscriber stations to the base station sector logic, the antenna array is operable to provide said reception beam for receiving the uplink communication provided in said sequence of variable duration communication channels.

The wireless communication between the point to multipoint device and the telecommunications units can take a variety of forms. However, in one embodiment the wireless communication is composed of a plurality of frames, with uplink communication taking place during at least a portion of each frame.

In one particular embodiment, the wireless communication is an IEEE 802.16 communication, with each frame comprising an uplink subframe for the uplink communication and a downlink subframe for downlink communication. In one such embodiment, the uplink subframe is separated in either time or frequency with respect to the downlink subframe.

The uplink subframe can be arranged in a variety of ways. In one embodiment, each uplink subframe is of the same duration as uplink subframes issued to other base stations in the wireless network. Alternatively, or in addition, each uplink subframe may be time aligned with uplink subframes issued to other base stations in the wireless network. In such embodiments, time alignment of the training sequences issued in each of the uplink subframes can be ensured by merely causing the first occurrence of the training sequence to be located at the same point within the first communication channel of the various uplink subframes issued to the various base stations in the wireless network. In one particular example, the first such training sequence is placed at the beginning of each uplink subframe.

The control data identifying the sequence of variable duration communication channels, the training sequence indication and the repetition rate, can be transmitted from the point to multipoint device to the telecommunications units in a variety of ways. In one embodiment, the control data is transmitted in the downlink subframe.

Viewed from a second aspect, the present invention provides a wireless network comprising a plurality of point to multipoint devices, each point to multipoint device being arranged to provide wireless communication with an associated plurality of telecommunications units, and each point to multipoint device being a point to multipoint device according to the first aspect of the present invention, wherein the plurality of point to multipoint devices are operable to repeat the determination of beamforming weights at the same time and at the repetition rate, each determination being coincident with the appearance of the training sequence in the associated sequence of variable duration communication channels.

Viewed from a third aspect, the present invention provides a method of operating a point to multipoint device used in a wireless network to provide wireless communication with a plurality of telecommunications units, for communication from the telecommunications units to the point to multipoint device, the point to multipoint device defining a sequence of variable duration communication channels, each communication channel being allocated to one of said telecommunications units, the method comprising the steps of: storing a training sequence indication indicating a training sequence associated with the point to multipoint device; storing a repetition rate at which the training sequence is to be repeated in said sequence of variable duration communication channels, the repetition rate being the same for all point to multipoint devices in the wireless network; receiving a synchronisation signal issued to all point to multipoint devices in the wireless network, and determining from the synchronisation signal a time at which a first occurrence of the training sequence is to occur within the sequence of variable duration communication channels; defining the sequence of variable duration communication channels and transmitting control data to the telecommunications units identifying the sequence of variable duration communication channels, the training sequence indication and the repetition rate; determining beamforming weights used to produce a reception beam, the beamforming weights being determined so as to improve received signal quality; controlling an antenna array to provide the reception beam for receiving the communication from the telecommunications units; and repeating the determination of beamforming weights at the repetition rate coincident with the appearance of the training sequence in the sequence of variable duration communication channels.

Viewed from a fourth aspect, the present invention provides a wireless network comprising: a plurality of point to multipoint devices, each point to multipoint device being arranged to provide wireless communication with an associated plurality of telecommunications units; each point to multipoint device being operable to define a sequence of variable duration communication channels for forming a communication from the associated telecommunications units to that point to multipoint device, and having an antenna array for producing a reception beam to receive that communication; each point to multipoint device having a training sequence associated therewith and being arranged to provide the associated telecommunications units with an indication of that training sequence and a repetition rate at which the training sequence is to be repeated in said sequence of variable duration communication channels, the repetition rate being the same for all of said point to multipoint devices; a time at which a first occurrence of the training sequence is to occur within the sequence of variable duration communication channels being derived with respect to a synchronisation signal received by all of the point to multipoint devices, whereby the plurality of point to multipoint devices are operable to repeat, at the same time and at the repetition rate, a determination of beamforming weights used to form their respective reception beams, each determination being coincident with the appearance of the training sequence in the associated sequence of variable duration communication channels.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
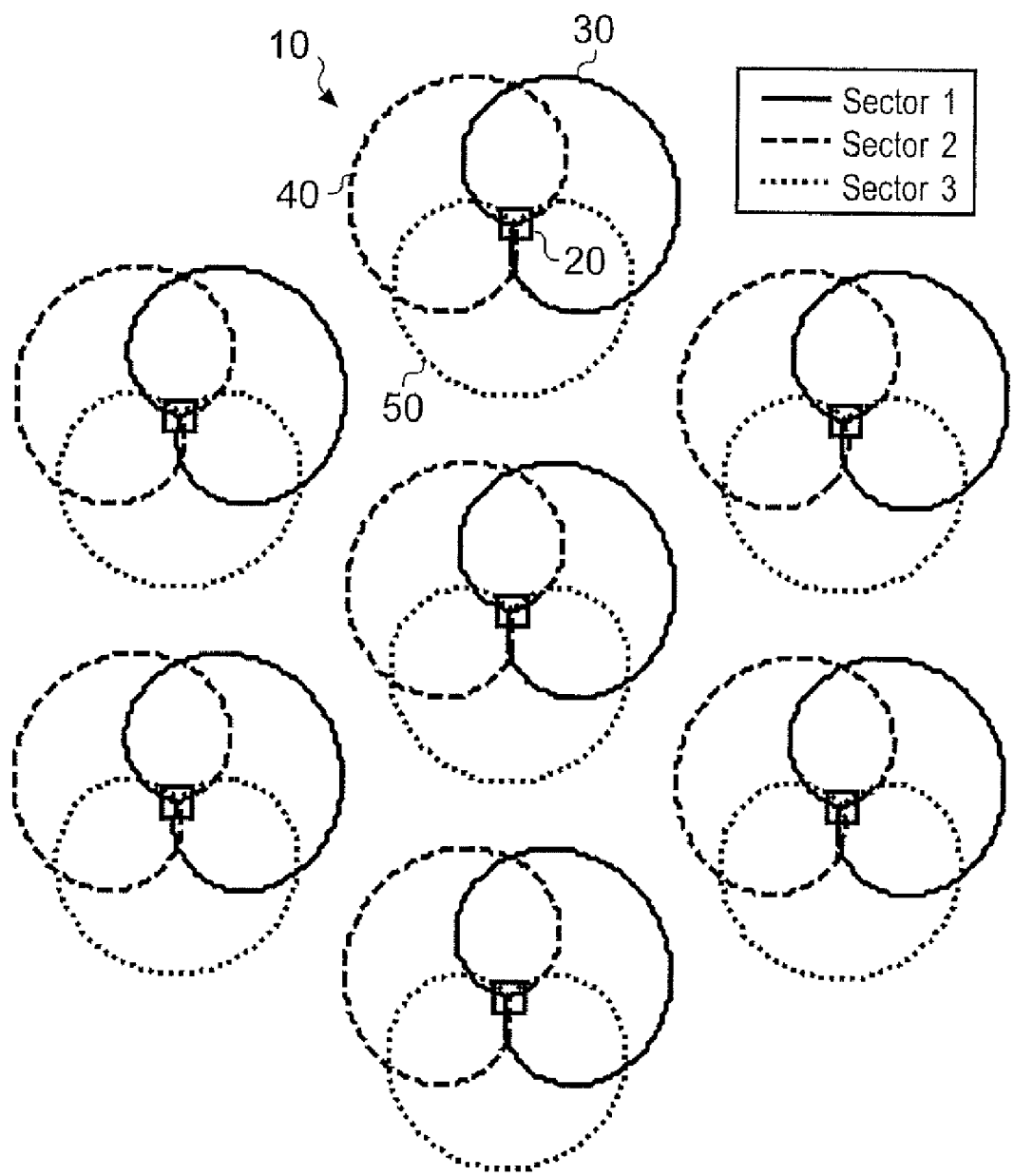
FIG. 1 is a block diagram of a wireless network in accordance with a prior art technique.
Figure 2:
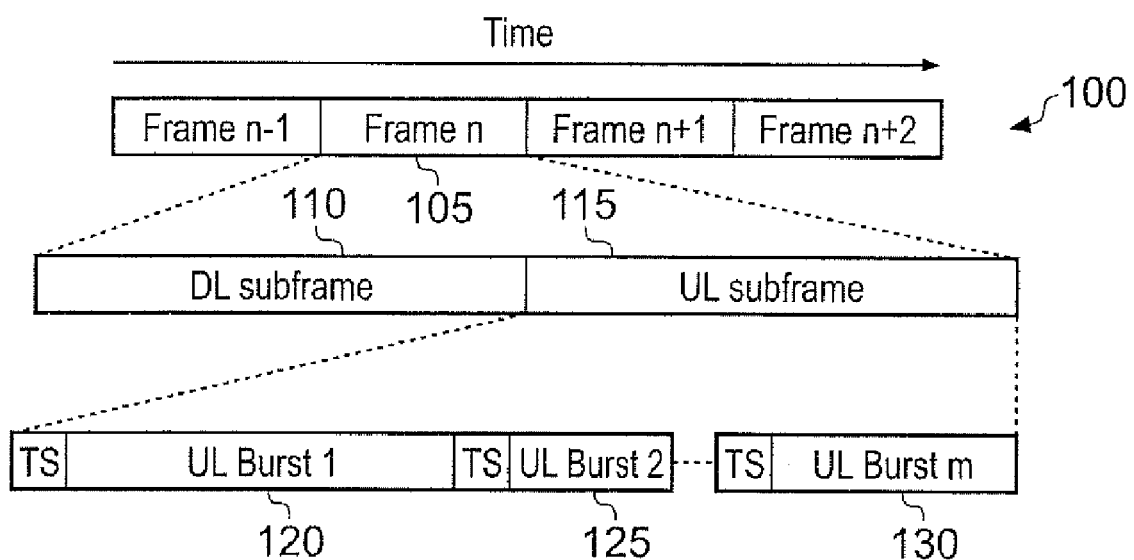
FIG. 2 is a diagram illustrating a Time Division Duplex (TDD) communication structure of the prior art.

The techniques of embodiments of the present invention can be applied to a variety of different point to multipoint devices that employ steered beam, or fully adaptive, antenna arrays to produce a reception beam for receiving communications from a plurality of telecommunications units. For the purpose of describing an embodiment of the present invention, a base station is considered as an example of such a point to multipoint device, with the base station (BS) being provided within a cell of a wireless network for communicating with a plurality of subscriber stations (SSs) provided within that cell. Each cell may be divided into multiple sectors, such as for example discussed earlier with reference to FIG. 1, and in such instances each BS will be arranged to use one or more antenna arrays to generate reception beams for each of the sectors. Whilst in such embodiments the point to multipoint device may be considered to be the entire base station, it can alternatively be formed by the individual base station sector logic associated with each sector of the cell.

Typically, the communication between a particular BS and any SSs within the associated cell will be formed as a sequence of frames. For the purposes of describing an embodiment of the present invention, it will be assumed that the communication structure used is a TDD communication structure such as that defined by the EEE 802.16 standards, with each frame consisting of an uplink subframe for uplink communication from the SSs to the BS and a downlink subframe for downlink communication from the BS to the SSs. For each uplink subframe, the BS will define a sequence of variable duration communication channels, with each communication channel being allocatable to one of the SSs within the associated cell or sector. In accordance with embodiments of the present invention, as will be described in more detail later, the BS includes communication channel control logic for issuing control data to the SSs identifying the sequence of variable duration communication channels, an indication of a training sequence to be repeated within the sequence of variable duration communication channels, and the repetition rate at which the training sequence should be repeated. In accordance with embodiments of the present invention, the repetition rate is the same for all BSs in the wireless network.

Figure 3:
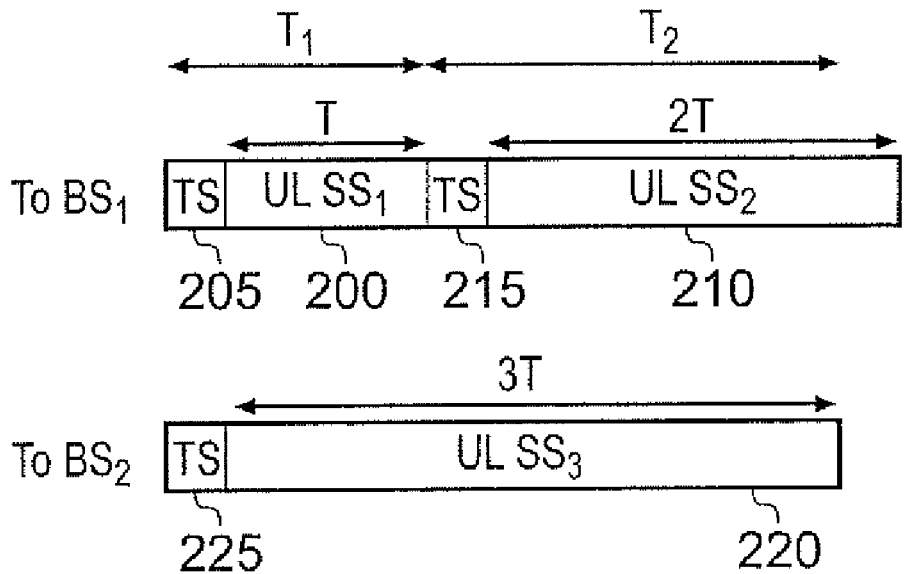
FIGS. 3 and 4 are diagrams illustrating how varying degrees of CCI can arise within an uplink subframe when adopting a prior art approach.
Figure 5:
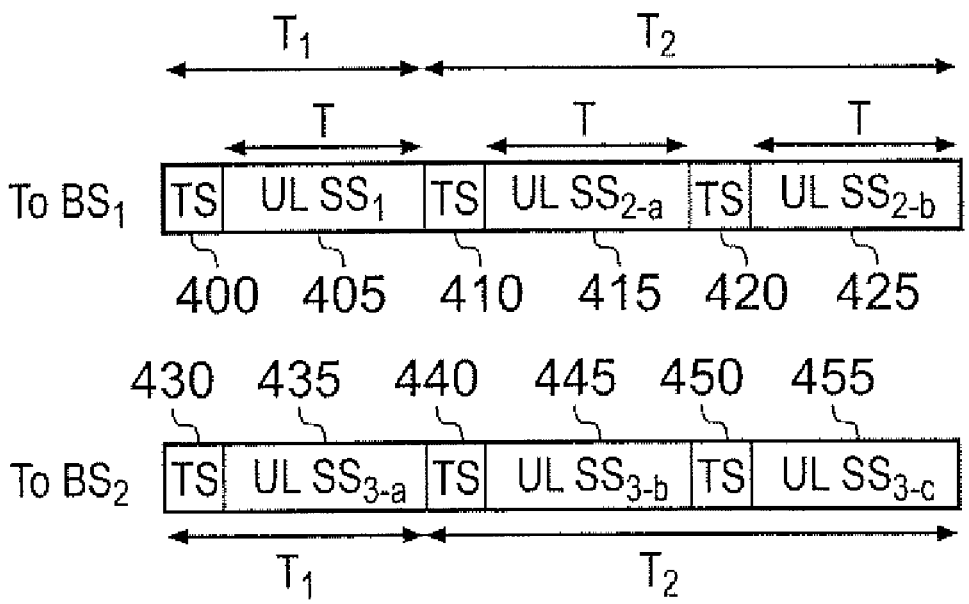
FIG. 5 is a diagram illustrating how the communication channels of the prior art illustrated in FIG. 3 are modified when employing a technique in accordance with an embodiment of the present invention.
Figure 4:
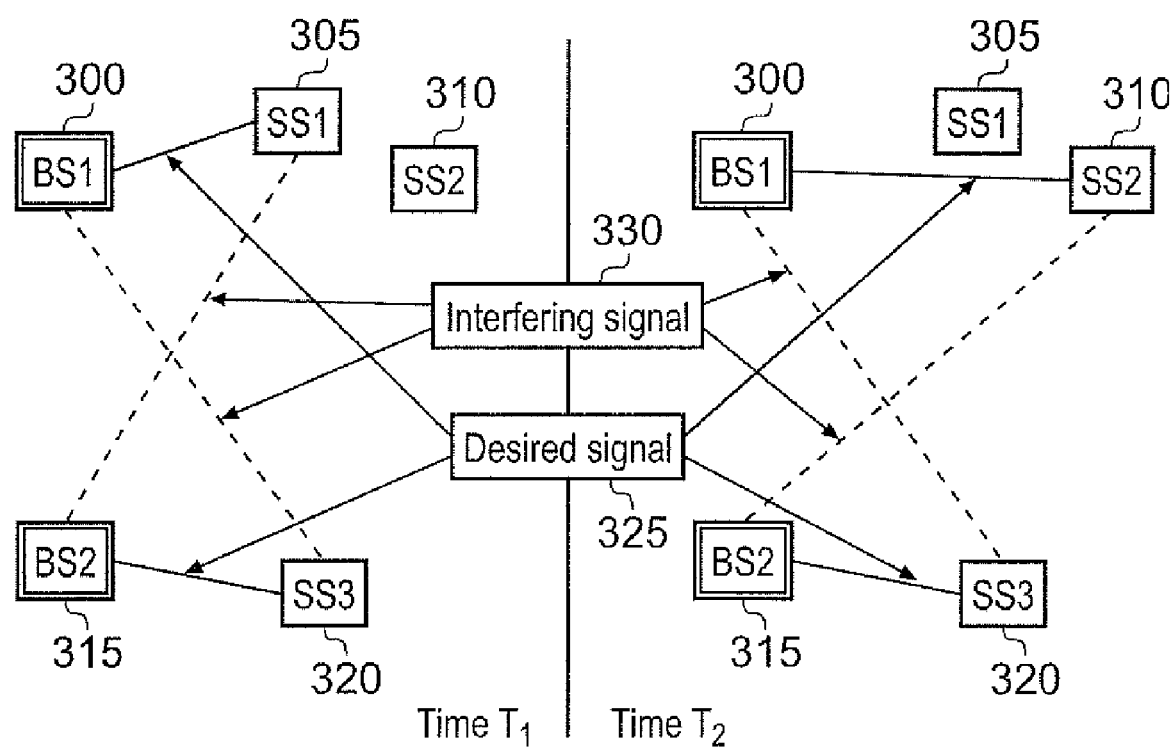

Furthermore, the BS is arranged to receive a synchronisation signal issued to all BSs in the wireless network, with the synchronisation signal being used to determine a time at which a first occurrence of the training sequence is to occur within the sequence of variable duration communication channels forming the uplink subframe. Accordingly, considering the earlier-described example discussed with reference to FIGS. 3 and 4, where two SSs, namely SS1 and SS2, communicate with a first BS, namely BS1, whilst elsewhere in the wireless network a further SS, namely SS3, communicates with a different BS, namely BS2, using the same channel, then FIG. 5 illustrates the resultant communication structure which is obtained when using embodiments of the present invention. By contrasting FIG. 5 with the prior art approach illustrated in FIG. 3, it can be seen that the communication channel allocated to SS1 is unaffected by the change in the communication structure, since the time T required to transmit the data from SS1 is less than the specified repetition rate for the training sequence. Accordingly, in the communication channel allocated to SS1, SS1 transmits the training sequence 400, followed by the payload data 405.

However, in contrast, the amount of data to be transmitted by SS2 is such that it does take longer to transmit than the repetition rate interval for the training sequence. Accordingly, in the communication channel allocated to SS2, SS2 transmits training sequence 410, followed by a first part of the data payload 415, followed by a second training sequence 420 and then the remainder of the payload 425.

Similarly, the amount of data to be transmitted by SS3 in the communication channel allocated to it by BS2 is such that the payload is broken down into three parts separated by the training sequence repeated at the repetition rate. Accordingly, in this communication channel, SS3 transmits training sequence 430, followed by a first part of the payload 435, followed by a training sequence 440, followed by a second part of the payload 445, followed by training sequence 450 and then finally the third part of the payload 455.

As a result of this approach, it will be seen from FIG. 5 that, across the wireless network, training sequences are inserted into the uplink subframes at the same time, and at the same repetition rate. In accordance with embodiments of the present invention, beamforming logic within each base station is arranged to repeat its determination of beamforming weights for the reception beam at the repetition rate and coincident with the appearance of the training sequences in the uplink subframes, this providing a stable period in which to calculate those beamforming weights. After each such beamforming weight determination, the CCI observed will be stationary until the next training sequence appears in the uplink subframe, i.e. the statistics of the CCI will be constant during that period. Although the CCI will then change upon occurrence of each training sequence, new beamforming weights will in any case be determined at that time.

Figure 6:
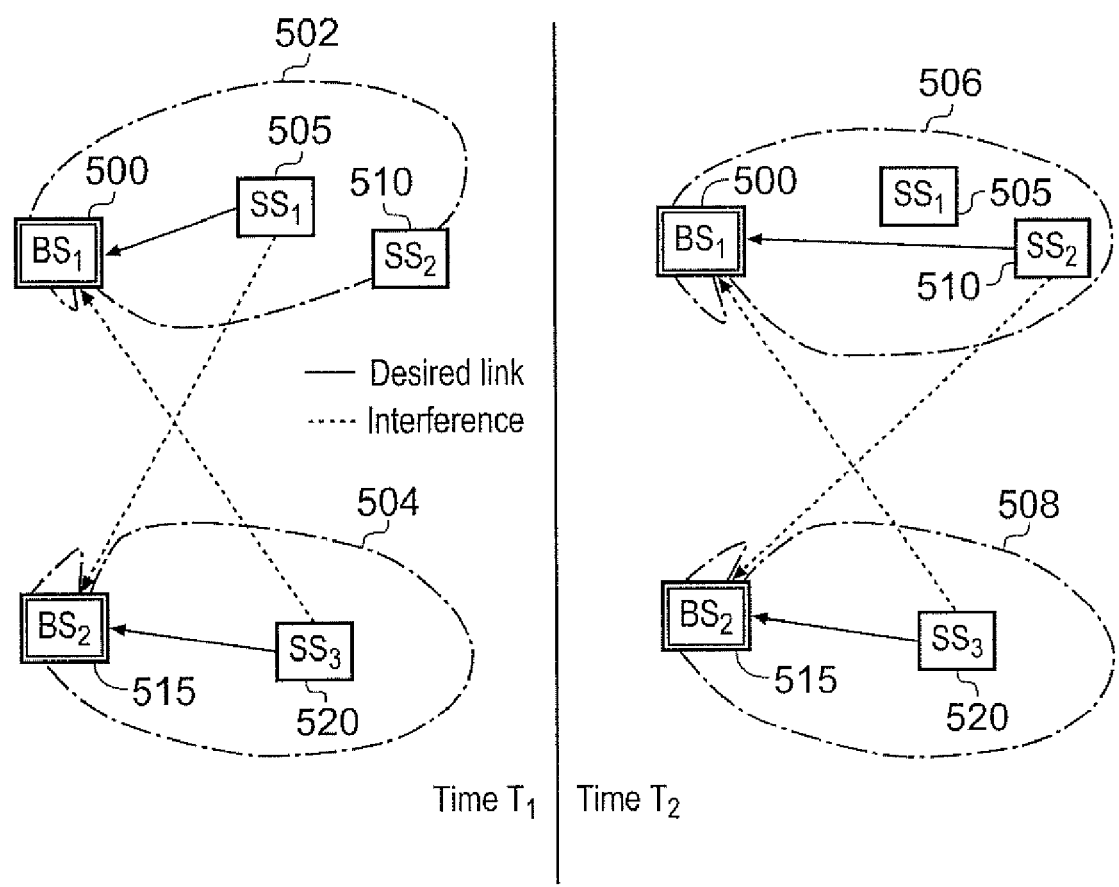
FIG. 6 is a diagram schematically illustrating how the steered beam antenna system of one embodiment of the present invention can be used to reduce CCI observed within the wireless network.

As a result, CCI can be reduced within the wireless network, as is illustrated schematically by FIG. 6. FIG. 6 illustrates the same configuration as described earlier with reference to FIG. 4, but in this instance the base stations BS1 500 and BS2 515 are arranged in the manner described above. Accordingly, whilst the training sequence 400 appears in the uplink communication from SS1 505 to BS1 500, BS1 500 will perform a training operation to generate beamforming weights that will produce the reception beam 502, this beam seeking to minimise the CCI produced by SS3 520, due to the placing of a null in the direction of SS3. Similarly, whilst the training sequence 430 appears in the uplink communication from SS3 520 to BS2 515, BS2 515 will perform a training operation to generate beamforming weights that produce the beam 504, which will seek to minimise the CCI resulting from the transmission from SS1 505.

When training sequence 410 is received in the uplink communication from SS2 510, then BS1 500 will repeat the beamforming weight determination in order to produce the beam 506 which again seeks to minimise the CCI produced by SS3 520. In accordance with embodiments of the present invention, training sequence 440 is also included at this time in the uplink communication from SS3 520 to BS2 515, even though the communication channel has not changed (i.e. it is still SS3 that is communicating with BS2). As a result, BS2 will calculate some new beamforming weights that produce the beam 508, which seeks to minimise the CCI produced by the new interferer, namely SS2 510.

The above process will also be repeated by BS1 upon receipt of the training sequence 420, and by BS2 upon receipt of the training sequence 450, but the beams are unlikely to change significantly due to the same SSs transmitting at that point.

Figure 7:
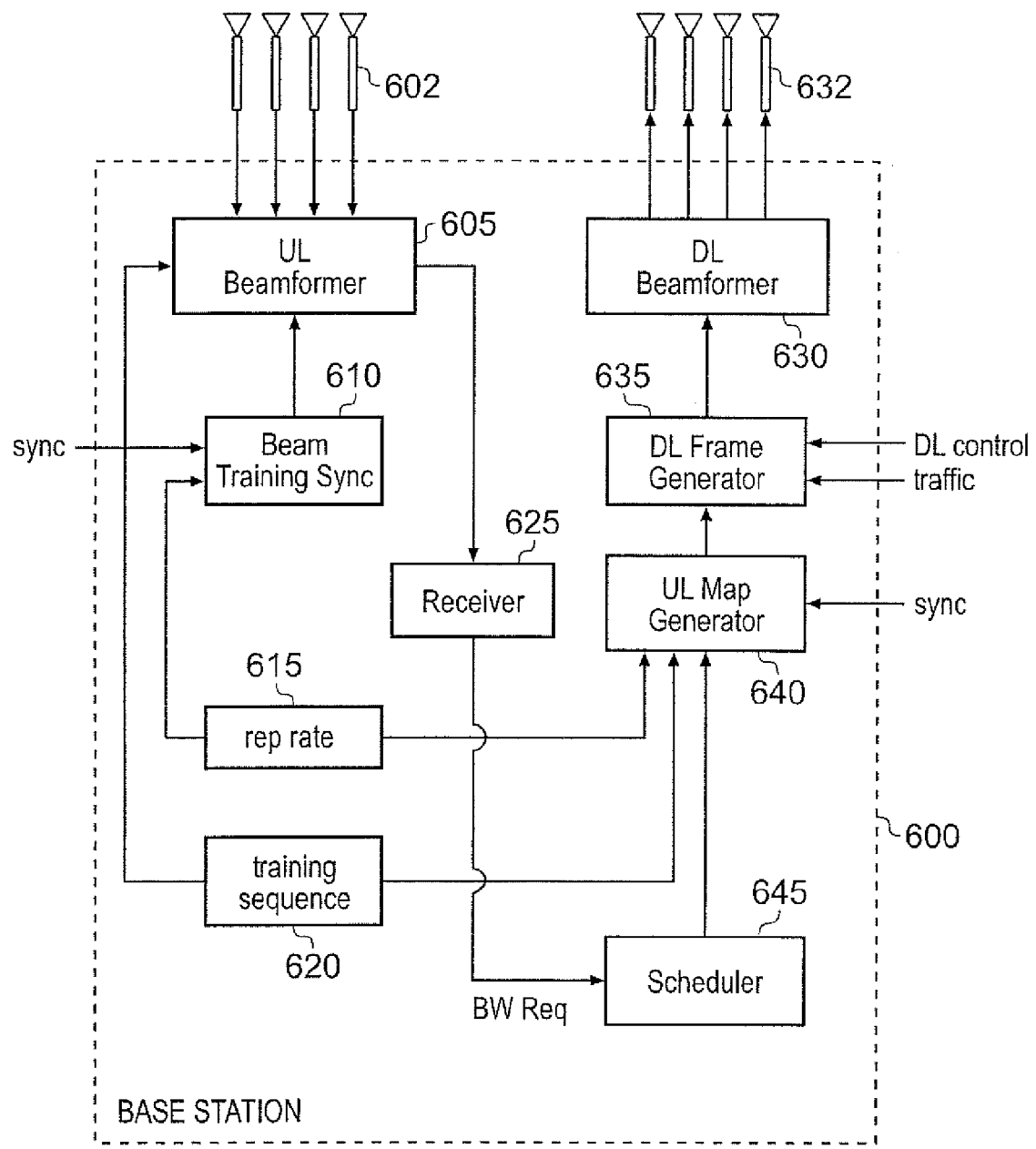
FIG. 7 is a block diagram of a base station in accordance with one embodiment of the present invention.

FIG. 7 is a block diagram illustrating a BS in accordance with one embodiment of the present invention. The BS 600 has an uplink antenna array 602 controlled by uplink beamformer logic 605 to receive signals issued to the BS 600 from SSs within the cell covered by the BS. The BS is arranged to store a training sequence indication 620 indicating a training sequence associated with that base station, in one embodiment that training sequence being unique with respect to training sequences associated with any other base stations in the wireless network. In a BS covering multiple sectors, a separate training sequence can be allocated for each sector. Additionally, the base station 600 stores a repetition rate 615 at which the training sequence is to be repeated in the variable duration communication channels forming the uplink subframe received by the antenna array 602. Both the training sequence and the repetition rate are in one embodiment provided to the BS from some central management logic within the wireless network.

Beam training synchronisation logic 610 is arranged to receive a synchronisation signal issued to all BSs in the wireless network, the synchronisation signal being used to determine a time at which a first occurrence of the training sequence is to occur within the uplink subframe. The beam training synchronisation logic 610 also receives the repetition rate 615, and based on the synchronisation signal and the repetition rate generates trigger signals for issuing to the uplink beamformer logic 605, these trigger signals being generated such that the uplink beamformer logic 605 is arranged to repeat its determination of appropriate beamforming weights to form the uplink reception beam each time the training sequence appears in an uplink subframe. Accordingly, the beamforming weights used for each antenna in the antenna array 602 are recalculated at the repetition rate 615 coincident with the appearance of the training sequence in an uplink subframe, with the aim of each time minimising the effects of CCI on the uplink communication from the desired SS.

The uplink communication received from the SSs in each uplink subframe is routed from the uplink beamformer circuit 605 to the receiver 625 for further processing. Such further processing is performed in accordance with any of a number of known techniques. As well as the various uplink communication channels provided within each uplink subframe, a further field within the uplink subframe is a bandwidth request field which is used by SSs within the cell to request bandwidth in a subsequent uplink subframe. Any bandwidth request signals are routed from the receiver 625 to the scheduler 645 of the base station 600.

Within each downlink subframe, an uplink map is included identifying the format of the corresponding uplink subframe. An uplink map generator 640 within the BS 600 is arranged to receive from the scheduler 645 an indication as to which SSs have data to send in an uplink subframe, and what length of communication channel should be allocated to each such SS. In one embodiment the length of the communication channels depends on the actual amount of data that needs to be transmitted and the desired quality of service (QoS). Further, the uplink map generator 640 receives the repetition rate 615, the training sequence 620, and the synchronisation signal issued to all base stations in the wireless network. Based on this information, the uplink map generator 640 generates an uplink map containing control data which identifies the sequence of variable duration communication channels to be used in the next uplink subframe, and the SS allocated to each of those communication channels, this information being derived from the information received from the scheduler 645. In addition, the control data in the uplink map also identifies a start time for the uplink subframe, the training sequence indication 620 and the repetition rate 615.

The uplink map is received by a downlink frame generator 635 which is arranged to generate a downlink subframe having regard to certain downlink control data and downlink traffic data, the downlink traffic data being data to be transmitted to particular SSs within the cell. The uplink map is included in one of the fields of the downlink subframe, and the downlink subframe once generated is then passed to the downlink beamformer logic 630 for transmission via the downlink antenna array 632. The downlink beamformer circuit 630 may be controlled in a variety of ways, and can be arranged to apply weights to the downlink antenna array 632 in accordance with any of a number of known techniques in order to seek to optimise transmission of signals to the appropriate SSs within the cell. In one particular embodiment, a fixed multi-beam antenna array technique can be employed by the downlink beamformer circuit 630, whereby one of a number of predetermined fixed beams is used for each downlink subframe.

Figure 8:
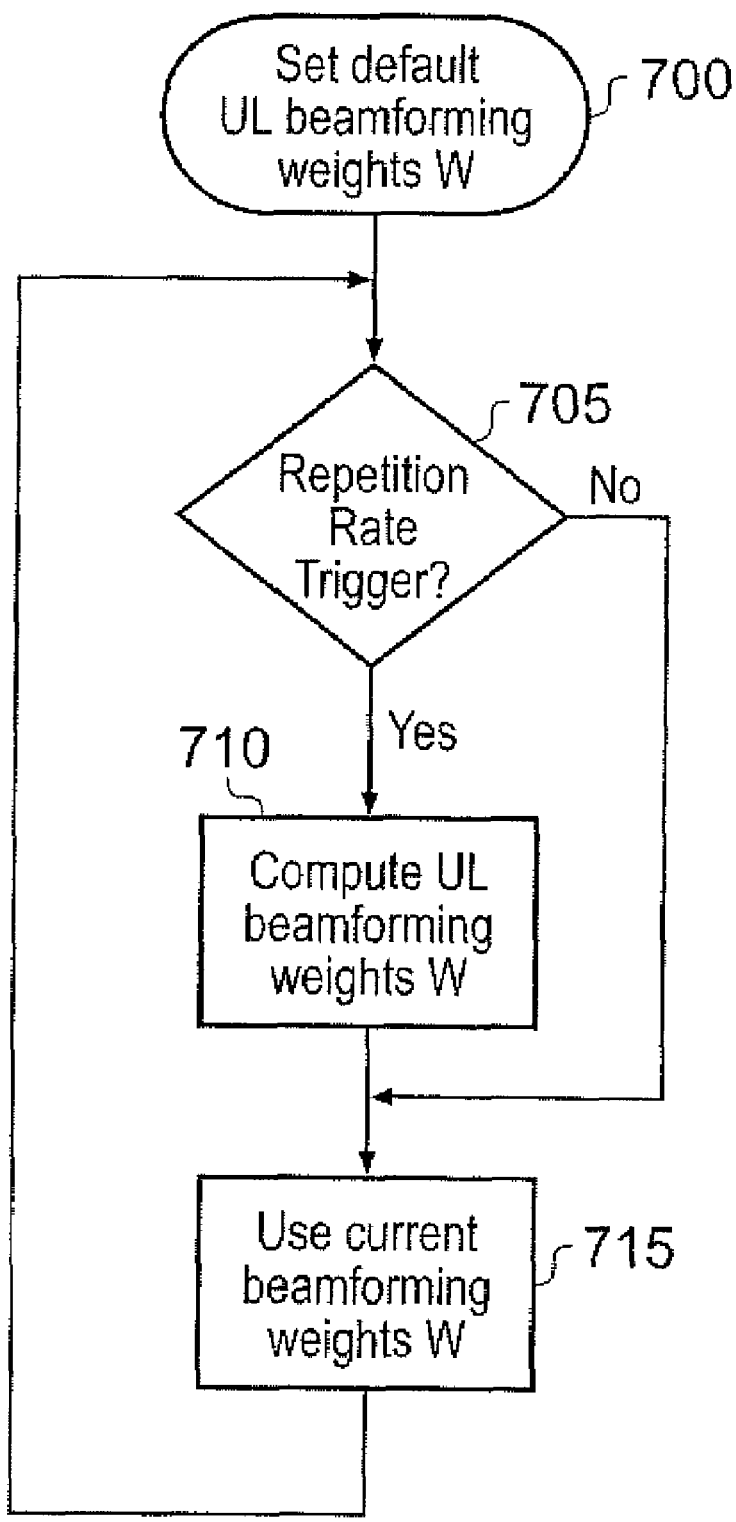
FIG. 8 is a flow diagram illustrating the operation of the uplink beamformer logic of FIG. 7 in accordance with one embodiment of the present invention.

FIG. 8 is a flow diagram illustrating the operation of the uplink beamformer logic 605 of FIG. 7 in accordance with one embodiment. At step 700, some default uplink beamforming weights are calculated for use to form an initial reception beam. These default beamforming weights can be calculated in a number of ways, and for example may be used to produce a broad beam enabling reception from any of the SSs within the associated cell or sector. Alternatively, the default beamforming weights may be chosen so as to only activate a single antenna. Thereafter, at step 705, it is determined whether a repetition rate trigger has been received from the beam training synchronisation logic 610. If not, then the current beamforming weights are used at step 715.

However, upon receipt of a repetition rate trigger, the process branches to step 710, where the uplink beamformer logic 605 is arranged to compute a new set of beamforming weights to be used to produce a reception beam by the antenna array 602. It will be appreciated by those skilled in the art that there are a number of well-known techniques that can be used to compute such beamforming weights, and indeed examples can be found in the earlier mentioned book "Smart Antennas, Adaptive Arrays, Algorithms and Wireless Position Location", edited by Dr. T S Rappaport, EEE, NJ 1998. Generally speaking, the signal being received by the antenna array 602 will be compared with the training sequence 620, and correction factors will be calculated in order to more closely align the received signal with the expected training sequence (it being appreciated from the earlier discussion that at the time the uplink beamformer circuit 605 is performing this process, the signal received by the antenna array 602 will be a signal corresponding to the training sequence issued by the SS within the cell transmitting at that time).

Figure 9:
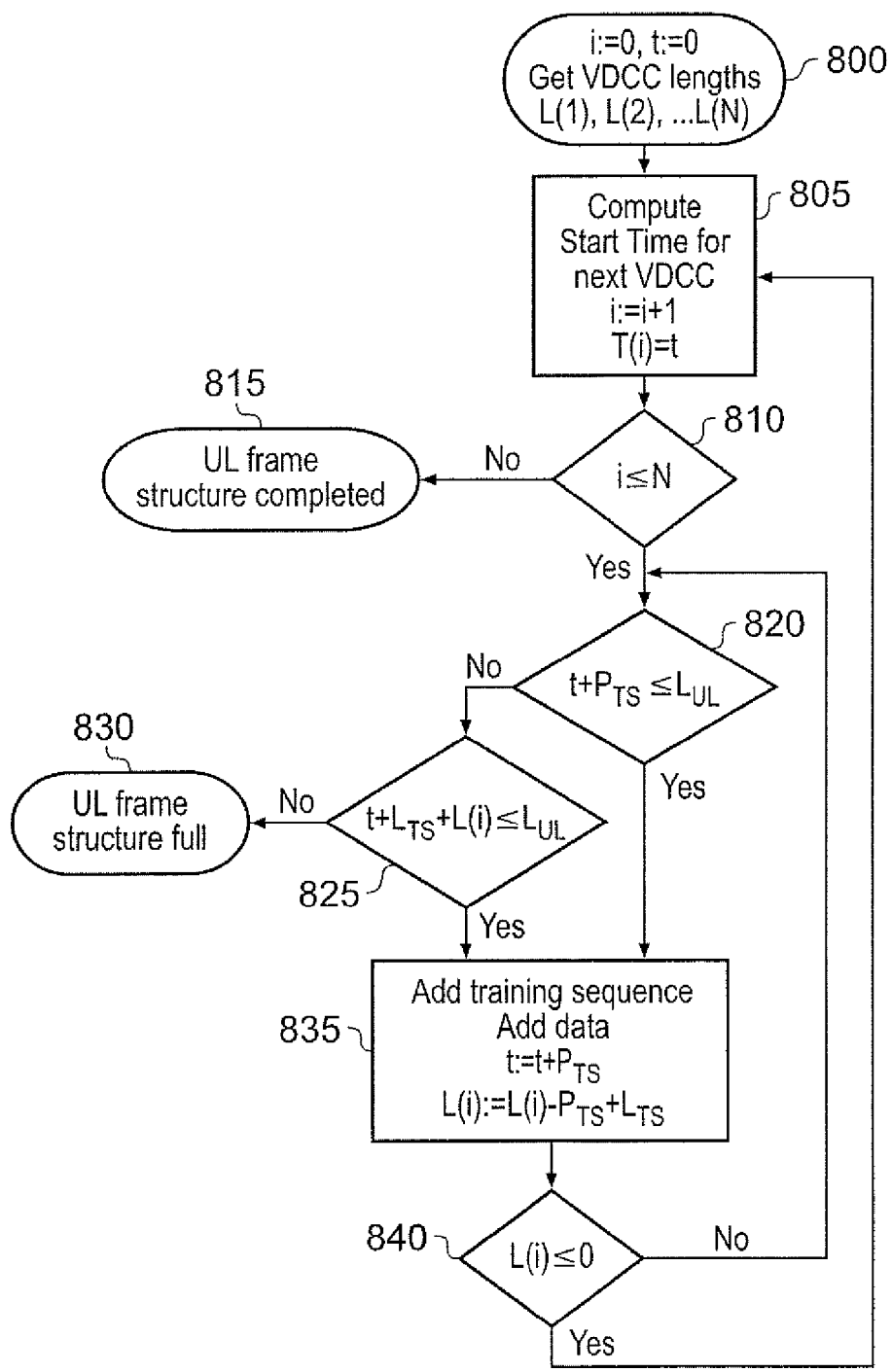
FIG. 9 is a flow diagram illustrating the operation of the uplink map generator logic of FIG. 7 in accordance with one embodiment of the present invention.

FIG. 9 is a flow diagram illustrating the operation of the uplink map generator 640 of FIG. 7 in accordance with one embodiment. At step 800, two parameters i and t are set equal to zero. Parameter t represents a time, and parameter i is used to identify each variable duration communication channel (VDCC) within the uplink subframe. For each such VDCC, the lengths of those channels are obtained, these being referred to as $L(1), L(2), \ldots, L(N)$.

At step 805, the start time for the next VDCC, in this case the first VDCC, is computed, this being determined with reference to the synchronization signal received by the uplink map generator 640. i is then incremented and a time $T(i)$ is set equal to t. Hence, during the first iteration, i will be set equal to one, and $T(i)$ will be initialised at zero.

Thereafter, at step 810, it is determined whether i is less than or equal to N, where N equals the number of VDCCs that the scheduler 645 has indicated would be required by all of the SSs that have currently indicated the desire to transmit data. If i is greater than N, then this indicates that the uplink frame structure is completed, and accordingly the process branches to step 815. However, assuming i is less than or equal to N, then the process proceeds to step 820 where it is determined whether $t+P_{TS} \leq L_{UL}$.

Figure 10:
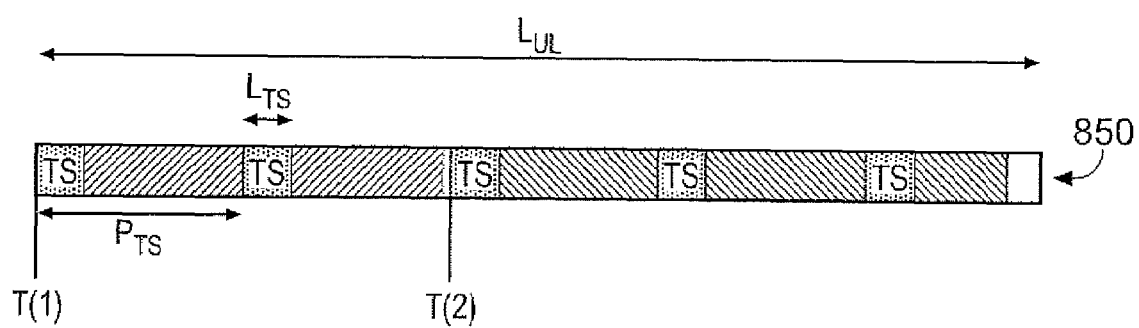
FIG. 10 is a diagram illustrating the features of an uplink subframe identified by some of the terms used in FIG. 9.

FIG. 10 is a diagram schematically illustrating some of the terms used in FIG. 9. Accordingly, it will be appreciated that the check performed at step 820 is determining whether there is sufficient space in the uplink subframe to insert another training sequence followed by payload data sufficient to fill the period of the training sequence $P_{TS}$. If there is sufficient space, then the process proceeds to step 835, where the training sequence and the associated payload data are allocated to the uplink subframe. At this point, the parameter t is updated by adding $P_{TS}$ to the current value of t, and in addition the length of the currently selected VDCC is updated to subtract the amount of payload data allocated to the uplink subframe.

If at step 820, it is determined that $t+P_{TS}$ is not less than or equal to $L_{UL}$ then the process proceeds to step 825, where it is determined whether $t+L_{TS}+L(i) \leq L_{UL}$. This test determines whether there is sufficient space nevertheless to add another training sequence and the remainder of the payload data existing to be transmitted in the current VDCC. By looking for example at the right-hand side of FIG. 10, it will be seen that the data following the fifth training sequence does not occupy the full length of $P_{TS}$, and accordingly although the test at 820 may have failed, the test at step 825 may not. Assuming the test at step 825 is passed, then the process proceeds to step 835, where the training sequence and remaining data are allocated to the uplink subframe, and the parameters t and L(i) are updated as described earlier. However, if the test at step 825 is not passed, then the process branches to step 830, where it is determined that the uplink frame structure is full. Thereafter, the scheduler 645 will need to reschedule for a subsequent uplink subframe the remaining data that has not been included in the current uplink subframe.

Following step 835, it is determined at step 840 whether the remaining data L(i) for the current VDCC is less than or equal to zero. If not, the process returns to step 820, whereas otherwise it is determined that all of the data for the current VDCC has been transmitted, and accordingly the process returns to step 805, where a start time is computed for the next VDCC.

Considering again the example of FIG. 10, this illustrates an example where N equals two, and accordingly two SSs wish to communicate data in the uplink subframe. In the example of FIG. 10, it can be seen that the data to be transmitted by both SSs can be accommodated within the uplink subframe, and in particular the first communication channel allocated to the first SS includes a training sequence, followed by a block of data, followed by another training sequence included after time $P_{TS}$, followed by the remaining data to be transmitted from the SS. Thereafter, the second communication channel is time aligned with the repetition rate, such that the TS forming the start of the second communication channel does not start until time $T(2)$. The SS allocated to this communication channel actually has more data to send than the SS allocated to the first communication channel, and accordingly the TS is repeated three times within that communication channel before all of the data has been transmitted.

Figure 11:
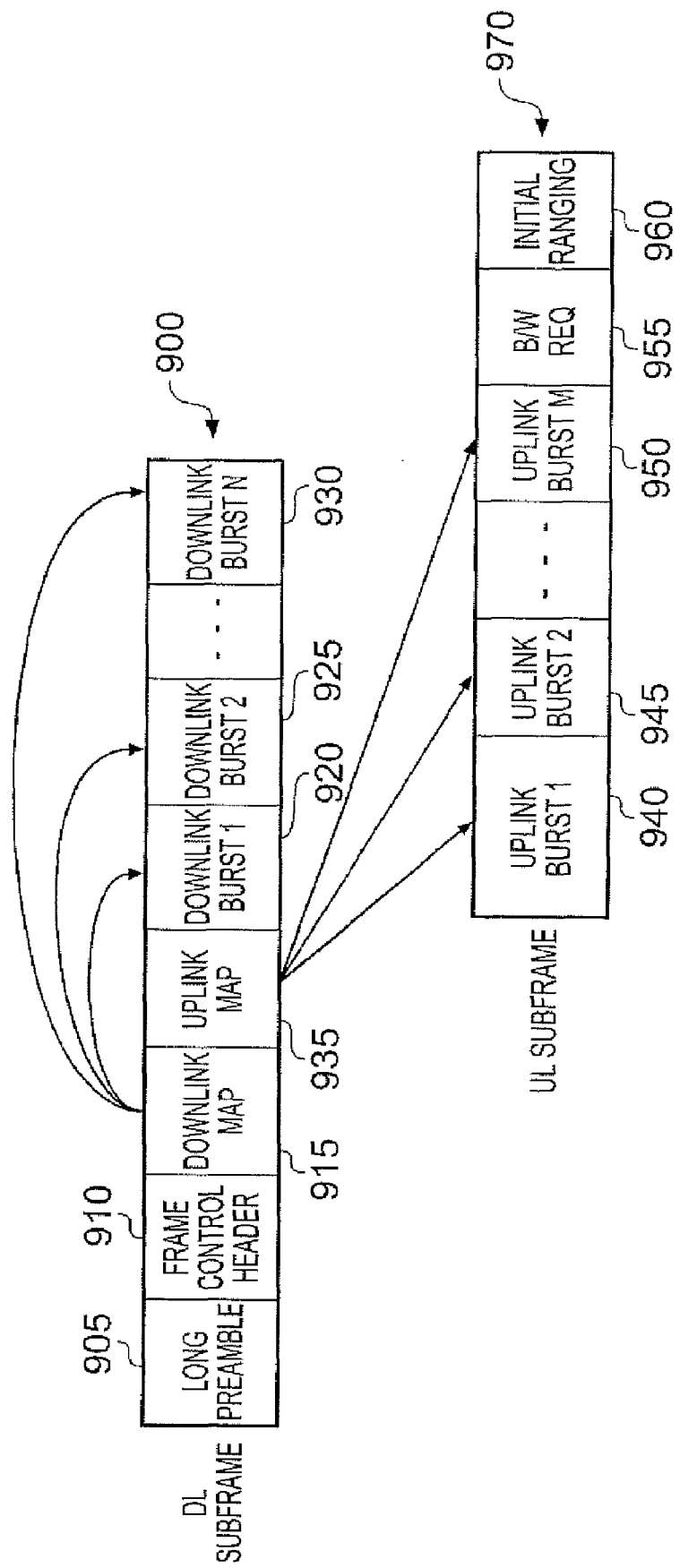
FIG. 11 is a diagram schematically illustrating a downlink subframe and a corresponding uplink subframe in accordance with one embodiment of the present invention.

FIG. 11 is a diagram schematically illustrating the format of a downlink subframe 900 and associated uplink subframe 970 in accordance with one embodiment of the present invention. The downlink subframe 900 includes a long preamble 905 which is used to assist an SS in performing equalisation and synchronisation with respect to the downlink signal. A frame control header 910 then provides information about what is to follow in the remainder of the downlink subframe, and accordingly in this example will identify that the remainder of the downlink subframe will consist of a downlink map 915, an uplink map 935, and a sequence of downlink communication channels (referred to in FIG. 11 as downlink bursts) 920, 925, 930. Each SS will review the downlink map 915 to determine whether there is downlink data destined for it, and if so will decode the relevant downlink burst. Similarly, each SS (or at least each SS that has requested uplink bandwidth) will review the uplink map 935 to determine whether it has been allocated an uplink communication channel 940, 945, 950, and if so will transmit its data in the allocated uplink channel.

As also shown in FIG. 11, the uplink subframe includes a bandwidth request field 955 which can be used by any of the SSs to request bandwidth in a subsequent uplink subframe to enable that SS to transmit data on the uplink path. Further, an initial ranging field 960 is provided, which is used by an SS when it first connects to the network to enable that SS to identify to the BS a particular downlink subframe that it has received, this information hence enabling the BS to allocate that SS to a particular beam used to produce that downlink subframe. When the BS subsequently needs to send downlink data to that SS, it can then ensure that the downlink data is sent in a downlink subframe produced using that same beam.

From the above description of an embodiment of the present invention, it will be appreciated that such an embodiment enables the implementation of a synchronised fast beam switching network utilising a fully adaptive antenna on the uplink communication path. In accordance with one such embodiment, each uplink subframe is aligned to an external clock via the synchronisation signal issued to all BSs in the network. Further, training sequences are inserted in the uplink subframes at a repetition rate which is the same for all BSs in the wireless network, hence ensuring that these training sequences are time aligned with training sequences issued in other uplink subframes used at the same time by other SSs to communicate with other BSs in the wireless network. This is achieved in one embodiment by splitting each variable duration communication channel into sub-bursts whose lengths corresponds with the repetition period of the training sequence.

Further, in accordance with embodiments of the present invention, a training sequence is associated with each BS (or BS sector logic) in the wireless network. In one embodiment, the training sequence allocated to a particular BS (or BS sector logic) is unique with respect to the training sequences allocated to other BSs (or other BS sector logic) in the wireless network. A training sequence indication is broadcast to the SSs in the downlink subframe to enable each SS that is to communicate on the uplink subframe to determine the training sequence to be used. The training sequence indication may directly specify the training sequence, or may provide some information from which the training sequence is derived. As an example of the latter situation, the training sequence may be formed by cyclic shifting a base training sequence, with that base training sequence being known by the various SSs. In such instances, the training sequence indication can identify a cyclic shift to be applied to the base training sequence in order to generate the training sequence associated with the BS.

In one embodiment, the actual form of the training sequence associated with a BS is fixed, and is hence identical each time it is repeated within the uplink subframe. However, in another embodiment, each instance of the training sequence included in the uplink subframe may be altered in a predetermined manner by the SS with respect to a preceding instance of that training sequence, whilst maintaining the uniqueness of each instance with respect to corresponding instances of training sequences associated with other BSs in the wireless network. The modification of the training sequences in such embodiments will typically be dictated by the relevant Standard(s).

In one embodiment, the training sequences used by each BS are mutually orthogonal, or have low autocorrelation and cross-correlation properties. In an IEEE 802.16 communication structure this may be achieved by the earlier-mentioned cyclic shifting of a base training sequence. All SSs connected to a specific BS will use the same cyclic shift delay. Such an approach enables a family of unique training sequences to be generated with different ones of those sequences being used by different BSs.

In accordance with embodiments of the present invention, the beamforming weights are calculated at the repetition rate coincident with the appearance of the training sequence in the uplink communication channel. Since the network is synchronised and fast fully adaptive beam switching takes place during each training sequence period, the CCI observed will be stationary during the period between training sequences, and hence the statistics of the CCI will be constant during that period.

Accordingly, from the above description of embodiments of the present invention, it will be appreciated that such embodiments can provide a particularly effective technique for reducing co-channel interference within a wireless network.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A point to multipoint device for use in a wireless network to provide wireless communication with a plurality of telecommunications units, for communication from the telecommunications units to the point to multipoint device, the point to multipoint device being configured to define a sequence of variable duration communication channels, each communication channel being allocatable to one of said telecommunications units, the point to multipoint device comprising:

training sequence storage for storing a training sequence indication indicating a training sequence associated with the point to multipoint device;

repetition rate storage for storing a repetition rate at which the training sequence is to be repeated in said sequence of variable duration communication channels, the repetition rate being the same for all point to multipoint devices in the wireless network;

an interface for receiving a synchronization signal issued to all point to multipoint devices in the wireless network, the synchronization signal being used to determine a time at which a first occurrence of the training sequence is to occur within the sequence of variable duration communication channels;

communication channel control logic for defining the sequence of variable duration communication channels and for causing control data to be transmitted to the telecommunications units identifying the sequence of variable duration communication channels, the training sequence indication and the repetition rate;

an antenna array for providing a reception beam for receiving the communication from the telecommunications units; and beamforming logic for determining beamforming weights used to produce the reception beam, the beamforming weights being determined so as to improve received signal quality, the beamforming logic being configured to repeat the determination of beamforming weights at the repetition rate coincident with the appearance of the training sequence in the sequence of variable duration communication channels.

2. A point to multipoint device as claimed in claim 1, wherein the communication channel control logic is configured to define the sequence of variable duration communication channels having regard to the telecommunications units that are to transmit data within those communication channels, the communication channel control logic being configured to cause an uplink map to be transmitted from the point to multipoint device identifying the sequence of variable duration communication channels, the telecommunications unit allocated to each communication channel, a start time for the sequence, the training sequence indication and the repetition rate.

3. A point to multipoint device as claimed in claim 1, wherein the point to multipoint device provides wireless communication within a plurality of sectors, the antenna array is arranged to produce a reception beam for each sector, and the communication channel control logic and beamforming logic are replicated for each sector.

4. A point to multipoint device as claimed in claim 3, wherein the training sequence storage is configured to store a separate training sequence indication for each sector.

5. A point to multipoint device as claimed in claim 1, wherein the wireless communication is composed of a plurality of frames, and the communication channel control logic is configured for each frame to define the sequence of variable duration communication channels to be used in that frame.

6. A point to multipoint device as claimed in claim 5, wherein the synchronization signal is received by the interface every m-th frame, where m is greater than or equal to 1.

7. A point to multipoint device as claimed in claim 1, wherein the training sequence associated with the point to multipoint device is unique with respect to other training sequences associated with other point to multipoint devices in the wireless network.

8. A point to multipoint device as claimed in claim 7, wherein the training sequence is orthogonal with respect to the training sequences allocated to other point to multipoint devices in the wireless network.

9. A point to multipoint device as claimed in claim 7, wherein the training sequence is formed by cyclic shifting a base training sequence, and the training sequence indication identifies the cyclic shift to be applied to the base training sequence to generate the training sequence associated with the point to multipoint device.

10. A point to multipoint device as claimed in claim 7, wherein each instance of the training sequence included in said sequence of variable duration communication channels is altered in a predetermined manner with respect to a preceding instance, whilst maintaining the uniqueness of each instance with respect to corresponding instances of training sequences associated with other point to multipoint devices in the wireless network.

11. A point to multipoint device as claimed in claim 1, wherein the communication channel control logic is configured to define the sequence of variable duration communication channels such that the training sequence is issued at least at the start of each communication channel.

12. A point to multipoint device as claimed in claim 1, wherein the point to multipoint device is a base station, the plurality of telecommunications units are a plurality of subscriber stations, and for uplink communication from the subscriber stations to the base station, the antenna array is configured to provide said reception beam for receiving the uplink communication provided in said sequence of variable duration communication channels.

13. A point to multipoint device as claimed in claim 12, wherein the wireless communication is composed of a plurality of frames, with uplink communication taking place during at least a portion of each frame.

14. A point to multipoint device as claimed in claim 13, wherein the wireless communication is an IEEE 802.16 communication, with each frame comprising an uplink subframe for the uplink communication and a downlink subframe for downlink communication.

15. A point to multipoint device as claimed in claim 14, wherein the uplink subframe is separated in either time or frequency with respect to the downlink subframe.

16. A point to multipoint device as claimed in claim 14, wherein each uplink subframe is of the same duration as uplink subframes issued to other base stations in the wireless network.

17. A point to multipoint device as claimed in claim 14, wherein each uplink subframe is time aligned with uplink subframes issued to other base stations in the wireless network.

18. A point to multipoint device as claimed in claim 14, wherein the control data identifying the sequence of variable duration communication channels, the training sequence indication and the repetition rate, is transmitted in the downlink subframe.

19. A point to multipoint device as claimed in claim 1, wherein the point to multipoint device is base station sector logic, the plurality of telecommunications units are a plurality of subscriber stations within an associated sector, and for uplink communication from the subscriber stations to the base station sector logic, the antenna array is configured to provide said reception beam for receiving the uplink communication provided in said sequence of variable duration communication channels.

20. A wireless network comprising a plurality of point to multipoint devices, each point to multipoint device being arranged to provide wireless communication with an associated plurality of telecommunications units, and each point to multipoint device being a point to multipoint device as claimed in any preceding claim, wherein the plurality of point to multipoint devices are operable to repeat the determination of beamforming weights at the same time and at the repetition rate, each determination being coincident with the appearance of the training sequence in the associated sequence of variable duration communication channels.

21. A method of operating a point to multipoint device used in a wireless network to provide wireless communication with a plurality of telecommunications units, for communication from the telecommunications units to the point to multipoint device, the point to multipoint device defining a sequence of variable duration communication channels, each communication channel being allocated to one of said telecommunications units, the method comprising the steps of:

- storing a training sequence indication indicating a training sequence associated with the point to multipoint device;
- storing a repetition rate at which the training sequence is to be repeated in said sequence of variable duration communication channels, the repetition rate being the same for all point to multipoint devices in the wireless network;
- receiving a synchronization signal issued to all point to multipoint devices in the wireless network, and determining from the synchronization signal a time at which a first occurrence of the training sequence is to occur within the sequence of variable duration communication channels;
- defining the sequence of variable duration communication channels and transmitting control data to the telecommunications units identifying the sequence of variable duration communication channels, the training sequence indication and the repetition rate;
- determining beamforming weights used to produce a reception beam, the beamforming weights being determined so as to improve received signal quality;
- controlling an antenna array to provide the reception beam for receiving the communication from the telecommunications units; and
- repeating the determination of beamforming weights at the repetition rate coincident with the appearance of the training sequence in the sequence of variable duration communication channels.

22. A wireless network comprising:
- a plurality of point to multipoint devices, each point to multipoint device being arranged to provide wireless communication with an associated plurality of telecommunications units;
- each point to multipoint device being configured to define a sequence of variable duration communication channels for forming a communication from the associated telecommunications units to that point to multipoint device, and having an antenna array for producing a reception beam to receive that communication;
- each point to multipoint device having a training sequence associated therewith and being arranged to provide the associated telecommunications units with an indication of that training sequence and a repetition rate at which the training sequence is to be repeated in said sequence of variable duration communication channels, the repetition rate being the same for all of said point to multipoint devices;
- a time at which a first occurrence of the training sequence is to occur within the sequence of variable duration communication channels being derived with respect to a synchronization signal received by all of the point to multipoint devices, wherein the plurality of point to multipoint devices are configured to repeat, at the same time and at the repetition rate, a determination of beamforming weights used to form their respective reception beams, each determination being coincident with the appearance of the training sequence in the associated sequence of variable duration communication channels.

* * * * *